(12) United States Patent
Obitko et al.

(10) Patent No.: US 8,984,014 B2
(45) Date of Patent: Mar. 17, 2015

(54) SYSTEM AND METHOD FOR RETRIEVING AND STORING INDUSTRIAL DATA

(71) Applicant: Rockwell Automation Technologies, Inc., Mayfield Heights, OH (US)

(72) Inventors: Marek Obitko, Kladno (CZ); Ivan Havel, Praha (CZ); Michal Fortik, Varnsdorf (CZ); Robert Mavrov, Praha (CZ); Radek Marik, Rez (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/875,931

(22) Filed: May 2, 2013

(65) Prior Publication Data

US 2013/0238606 A1 Sep. 12, 2013

Related U.S. Application Data

(62) Division of application No. 12/241,734, filed on Sep. 30, 2008, now Pat. No. 8,438,192.

(51) Int. Cl.
*G06F 17/30* (2006.01)
*G05B 21/02* (2006.01)
*G06Q 10/06* (2012.01)

(52) U.S. Cl.
CPC .......... *G06F 17/30569* (2013.01); *G05B 21/02* (2013.01); *G06F 17/30286* (2013.01); *G06Q 10/06* (2013.01); *Y10S 707/953* (2013.01); *Y10S 707/964* (2013.01)
USPC .......... 707/791; 707/608; 707/602; 707/821; 707/953; 707/964

(58) Field of Classification Search
USPC .......... 707/608, 602, 791, 802, 821, 953, 964
See application file for complete search history.

(56) References Cited

U.S. PATENT DOCUMENTS

| | | | |
|---|---|---|---|
| 5,774,374 A * | 6/1998 | Scott et al. | 702/155 |
| 6,490,581 B1 * | 12/2002 | Neshatfar et al. | 1/1 |
| 6,535,229 B1 | 3/2003 | Kraft | |
| 7,912,561 B2 * | 3/2011 | Hsiung et al. | 700/28 |
| 8,028,272 B2 * | 9/2011 | Eldridge et al. | 717/110 |
| 2002/0169768 A1 | 11/2002 | Lowe et al. | |
| 2003/0163455 A1 | 8/2003 | Dettinger et al. | |
| 2005/0004911 A1 | 1/2005 | Goldberg et al. | |
| 2005/0015364 A1 | 1/2005 | Payton et al. | |

(Continued)

OTHER PUBLICATIONS

Hearst, M. et al; "Finding the Flow in Web Site Search"; Communications of the ACM—vol. 45, No. 9; Sep. 2002; pp. 42-49.

(Continued)

*Primary Examiner* — Sana Al Hashemi
(74) *Attorney, Agent, or Firm* — Whyte Hirschboeck Dudek S.C.

(57) ABSTRACT

The invention provides a system and method for retrieving and storing industrial data, the system comprising a data retriever that includes a data retrieval manager and one or more watchers for monitoring data associated with one or more industrial devices, wherein if the data associated with the one or more industrial devices is new or modified, the one or more watchers notifies the data retrieval manager thereof and the data retrieval manager uploads the new or modified data. The system further includes a database manager for receiving the new or modified data in a first form from the data retrieval manager and for storing the new or modified data in a structural data form in one or more databases.

20 Claims, 6 Drawing Sheets

(56) References Cited

U.S. PATENT DOCUMENTS

| | | | |
|---|---|---|---|
| 2005/0114288 | A1 | 5/2005 | Dettinger et al. |
| 2005/0131889 | A1 | 6/2005 | Bennett et al. |
| 2005/0187911 | A1 | 8/2005 | Tunning |
| 2005/0192953 | A1 | 9/2005 | Neale et al. |
| 2006/0294089 | A1 | 12/2006 | Devost et al. |
| 2007/0169768 | A1* | 7/2007 | Chung ........................ 126/25 R |
| 2008/0288869 | A1 | 11/2008 | Ubillos |
| 2009/0177603 | A1* | 7/2009 | Honisch ........................ 706/45 |
| 2010/0082669 | A1 | 4/2010 | Obitko et al. |
| 2010/0138017 | A1 | 6/2010 | Vrba et al. |
| 2010/0153412 | A1 | 6/2010 | Mavrov et al. |

OTHER PUBLICATIONS

Yee, K. et al; "Faceted Metadata for Image Search and Browsing"; CHI Annual Conference—Ft. Lauderdale, Florida; Apr. 5-10, 2003; pp. 401-408.

Heast M.; "Clustering Vesus Faceted Categories for Information Exploration"; Communicatons of the ACM—vol. 49, No. 4; Apr. 2006; pp. 59-61.

Resource Description Framework (RDF)—Semantic Web Standards; http://www.w3.org/RDF; Feb. 10, 2004; 3 pages.

RDF Primer—W3C Recommendation; http://www.w3.org/TR/rdf-primer; Feb. 10, 2004; 109 pages.

SPARQL Query Language for RDF—W3C; http:www.w3.org/TR/rdf-sparql-query; © 2006-2007/; 103 pages.

W3C Recommendation—XQuery 1.0 and XPath 2.0 Functions and Operators; Section 7.6.1; http://www.w3.org/TR/2007/REC-xpath-functions-20070123/#regex-syntax; Jan. 2007; 6 pages.

Adobe Flex, Open-source Framework; http://www.adobe.com/products/flex.html; 2 pages; accessed from the internet on Jul. 20, 2012—admitted prior art.

Resource Description Framework (RDF)—Wikipedia; http://en.wikipedia.org/wiki/Resource_Description_Framework; 13 pages; accessed from the internet on Jul. 23, 2012—admitted prior art.

Faceted Search—Wikipedia; http://en.wikipedia.org/wiki/Faceted_Search; 3 pages; accessed from the internet on Jul. 20, 2012—admitted prior art.

SQL—Wikipedia; http://en.wikipedia.org/wiki/SQL; 17 pages; accessed from the internet on Jul. 23, 2012—admitted prior art.

SPARQL—Wikipedia; http://en.wikipedia.org/wiki/Sparql; 4 pages; accessed from the internet on Jul. 23, 2012—admitted prior art.

Obitko, Marek, Translations Between Ontologies in Multi-Agent Thesis, Dissertation Thesis, Feb. 2007, Czech Technical University in Prague Faculty of Electrical Engineering Department of Cybernetics, pp. 1-139.

Mulani, J. et al; "A graphical navigator for viewing databases"; Software Practice & Experience, 1996 Wiley & Sons, Bognar Regis, GB, vol. 26, No. 4, Apr. 11, 1996; pp. 411-426.

Murray, N; Paton, N; Gobel, C.;"Kaleidoquey: A visual query language for object databases" Proceedings of the Working conference on Advanced Visual Interfaces, 1998, pp. 247-257, USA.

Santucci, G. et al: "Query by Diagram; A visual environment for querying databases" Software Practice & Experience, 1993 Wiley & Sons, Bognar Regis. GB, vol. 23, No. 3, Mar. 1, 1993.

Lam, H. et al: "A graphical interface for an object-oriented query language", Computer Software and Applications conference, 1990. Compsac 90, ProceEdings, 14th Annual International, Chicago, IL USA, Oct. 31, 1990, IEEE; Los Alamitos, CA, USA, pp. 231-237.

Batini, C. et al: "Visual strategies for querying databases", Visual Languages 1991, Proceedings, 1991, IEEE Workshop on Kobe, Japan Oct. 9-11, 1991, Los Alamitos, CAUSA, IEEE Comput. Soc., Oct. 8, 1991, pp. 183-189.

International Search Report; Application No. 09179071.7-2201; Mar. 30, 2010; 8 pages.

The Tabulator: Generic Data Browser; http://www.w3.org/2005/ajar/tab; printed Mar. 10, 2009; 2 pages.

OWL Web Ontology Language Overview; http://www.w3.org/TR/owl-features; Feb. 10, 2004; 18 pages.

Relational Database; http://en.wikipedia.org/wiki/Relational_database; printed Nov. 2, 2012; 6 pages.

Relational Mode; http://en.wikipedia.org/wiki/Relational_model; printed Nov. 2, 2012; 1 page.

SPARQL vs. SQL—Intro; Cambridge Semantics; http://www.cambridgesemantics.com/semantic-university/sparql-vs-sql-intro; printed Nov. 2, 2012; 9 pages.

Pull Technology; http://en.wikipedia.org/wiki/Pull_technology; printed Nov. 2, 2012; 1 page.

PIXMANIA—online shopping, low prices & discounts on high tech products; http://www.pixmania.co.uk; printed Nov. 2, 2012; 13 pages.

Obitko, M. et al:"Semantic Web Technologies in Manufacturing Systems";Czech Technical University; Jun. 1, 2007; 12 pages.

Obitko, M. et al: "Semantics in Industrial Distributed Systems"; International Federation of Automatic Control; Jul. 2008; 8 pages.

Adkisson, H.: "Use of Faceted Classification"; http://www.webdesignpractices.com/navigation/facets; © 2005; 4 pages.

Faceted Browser; Massachusetts Institute of Technology; http://simile.mit.edu/wiki/Faceted_Browser; © 2003-2008; 2 pages.

Google Desktop Search (GDS); http://en.wikipedia.org/wiki/Google_Desktop; printed Nov. 13, 2012, admitted prior art; 8 pages.

Inside Google Desktop; http://googledesktop.blogspot.co.uk/; printed Nov. 13, 2012, admitted prior art; 5 pages.

Windows Desktop Search (WDS ); http://en.wikipedia.org/wiki/Windows_Search; printed Nov. 13, 2012, admitted prior art; 11 pages.

RSLogix 5000 Design & Configuration; Rockwell Automation; http://www.rockwellautomation.com/rockwellsoftware/design/rslogix5000/; printed Nov. 13, 2012, admitted prior art; 1 page.

FactoryTalk View Performance & Visibility; Rockwell Automation; http:/www.rockwellautomation.com/rockwellsoftware/performance/view/; printed Nov. 13, 2012, admitted prior art; 1 page.

MSDN FindFirstChangeNotification function; http://msdn.microsoft.com/en-us/library/aa364417%28VS.85%29.aspx; printed Nov. 13, 2012, admitted prior art; 5 pages.

Code Project—How to get a notification if change occurs in a specified directory; http://www.codeproject.com/Articles/4692/How-to-get-a-notification-if-change-occurs-in-a-sp; printed Nov. 13, 2012, admitted prior art; 7 pages.

U.S. Non-Final Office Action for U.S. Appl. No. 12/334,913 dated Jul. 25, 2014, 120 pages.

Interview Summary for U.S. Appl. No. 12/334,913 dated Jul. 26, 2012, 3 pages.

Advisory Action for U.S. Appl. No. 12/334,913 dated Mar. 28, 2012, 3 pages.

U.S. Final Office Action for U.S. Appl. No. 12/334,913 dated Nov. 21, 2011, 57 pages.

Interview Summary for U.S. Appl. No. 12/334,913 dated Oct. 21, 2011, 3 pages.

U.S. Non-Final Office Action for U.S. Appl. No. 12/334,913 dated Feb. 14, 2011, 31 pages.

EP Communication dated Dec. 1, 2010, 3 pages.

EP Communication dated Apr. 1, 2011, 1 page.

\* cited by examiner

SYSTEM AND METHOD FOR RETRIEVING AND STORING INDUSTRIAL DATA

CROSS-REFERENCE TO RELATED APPLICATIONS

This application is a division of, and claims priority to, U.S. utility patent application Ser. No. 12/241,734 filed on Sep. 30, 2008, the entire content of which is incorporated by reference herein.

STATEMENT REGARDING FEDERALLY SPONSORED RESEARCH OR DEVELOPMENT

Not Applicable

FIELD OF THE INVENTION

The present invention relates to a system and method for retrieving various types and forms of industrial data, and storing the data in a structural data form in one or more databases, wherein the structural data form is suitable for a structural or semantic search.

BACKGROUND OF THE INVENTION

Industrial automation or control systems include controllers to control machinery in a manufacturing process, as well as human machine interfaces (HMI) to allow operators to interact with the controller or other devices in the system. A controller is a special purpose computer that runs a stored control program in a specific programming language in real-time. The controller examines a series of inputs, typically from sensors, reflecting the status of a controlled machine or process and, based on the logic of the control program, generates outputs in the form of electrical signals to control actuators or the like to control the machine or process. In general, controllers are constructed in a modular fashion to accommodate different applications requiring different numbers and types of inputs and outputs as is determined by the particular machine or process being controlled. One type of controller is a programmable logic controller (PLC), which typically runs under the direction of a ladder logic program, and includes instructions or statements which define relationships between an output variable and one or more input variables. In ladder logic programs, the input and output variables may be represented graphically as contact symbols and coil symbols arranged in a series of rungs running between a pair of vertical power rails, and it is common to represent and view these programs graphically.

Industrial control systems can also include other devices such as desktop computers of engineers or designers, and servers for control system back up and security binding. The personal computers are also used during control system design, and can be used for simulations producing data to be searched as well. Along with the controllers and HMI devices, these industrial devices can store a significant amount of data of various types and taking a variety of forms, including for example, ladder logic or other program instructions, input/output configurations, network configuration, physical layout configuration, graphics information, sensor information, and more. Much of this data is stored in associated data files, typically located on file systems on these devices as well as computers in one or more locations. The data are typically also stored in projects (located in file systems of computers) that were used to configure the devices or to run simulations. The industrial devices can also generate a significant amount of data relevant to the operation of the manufacturing process, such as data indicative of various events, including alarms, which can occur in the control system. Also, data collected from sensors can be archived, for example to allow diagnostics in the future. This industrial data is relevant and useful to an operator such as a control system designer or control system administrator in order to design new systems, add components, design new programs or interfaces, or trouble shoot problems. Further, the structural arrangement of the various industrial devices which make up the control system may be relevant to the control system designer or administrator.

Currently, searching in industrial data is problematic and generally limited by the user interface and ways of search provided by software applications. For example, when a control program for a PLC or an interface program for a HMI device is developed, a designer typically manually references one or more existing sources of information, such as existing PLC ladder logic programs and/or HMI graphic files, in order to copy specific portions of data in an effort to save time and expense. This can require the designer to access each individual device or other locations, such as a server or personal computers of control system designers or administrators, to obtain the most current information. Further, once a designer has accessed a particular device or file storage point, the data stored therein can be cumbersome to search as the various industrial devices may utilize different data formats for different types of devices, requiring the designer to be familiar with the specific data format and search methodology.

Similarly, when servicing these industrial devices, a technician will often have to be familiar with many interrelated data variables in order to perform an effective search to uncover problems, as a standard search may not reveal all of the variables. Furthermore, various fault events that occur on a particular device may be cumbersome to resolve, as a technician will typically have to search all interrelated devices for specific points of data that are related to that fault event. If a similar event has occurred in another device running a similar process, the technician would desire to access that device in an effort to discover the discrepancies with the faulting device. Thus, accessing the devices themselves in order to acquire data can be cumbersome, inefficient and impractical. Furthermore, a service technician or system designer is commonly situated at a particular industrial facility and may be limited to accessing only the devices and data available at that particular facility.

Therefore, it would be desirable to provide a system and method for retrieving different types of data associated with a variety of industrial sources, and storing such data in a manner that it can be easily accessed and searched. Also, in addition to keyword based searching, the format of data should allow utilizing structural relations in industrial data for formulating search queries and for answering them.

BRIEF SUMMARY OF THE INVENTION

A system and method for retrieving various types of data from a variety of sources has been developed to address one or more of the prior art shortcomings mentioned above. In particular, in at least some embodiments, industrial data can be gathered from a plurality of data sources, can be converted to a common structural form, and aggregated in one or more databases, which can then be searched using a structural search query.

In at least some embodiments, the present invention relates to a system for retrieving and storing industrial data, the system comprising a data retriever that includes a data retrieval manager and one or more watchers for monitoring data associated with one or more industrial devices, wherein if the data associated with the one or more industrial devices is new or modified, the one or more watchers notify the data retrieval manager thereof and the data retrieval manager uploads the new or modified data. The system further includes a database manager for receiving the new or modified data in a first form from the data retrieval manager and for storing the new or modified data in a structural data form in one or more databases.

In other embodiments, the present invention relates to a system for retrieving and storing industrial data, the system comprising a data retriever including a data retrieval manager and one or more watchers for monitoring data associated with one or more industrial devices, wherein the data retrieval manager is in communication with at least one of a file system, an event logger, a real time data logger, and a device network. If the data associated with the one or more industrial devices is new or modified, the one or more watchers notify the data retrieval manager thereof and the data retrieval manager uploads the new or modified data. The system further includes a database manager for receiving the new or modified data in a first form from the data retrieval manager, for converting the new or modified data in the first form to new or modified data in a structural data form, and for storing the new or modified data in the structural data form in one or more databases, wherein the structural data form is suitable for a structural search query.

In another embodiment, the present invention relates to a method for retrieving industrial data and providing data in a structural form in a searchable database, the method including reading data from an industrial data source, using a watcher to monitor the data for modifications and notifying a data retrieval manager when additions or modifications to the data have occurred. The method further includes uploading any new or modified data from the data source to the data retrieval manager, converting the new or modified data to a structural form and storing the new or modified data in a structural form in a searchable database.

In at least one additional embodiment, the present invention relates to an industrial automation system capable of retrieving and storing industrial data. The system includes a plurality of industrial controllers, at least one human-machine interface (HMI) device, a data retriever in communication with the industrial controllers and the HMI device, and a database manager. The data retriever includes a data retrieval manager and one or more watchers for monitoring data associated with at least one of the industrial controllers and the HMI device. Further, the data retrieval manager is in communication with at least one of a file system, an event logger, a real-time data logger, and a device network, and if the monitored data is new or modified, the one or more watchers notifies the data retrieval manager thereof and the data retrieval manager uploads the new or modified data. Additionally, the database manager is for receiving the new or modified data in a first form from the data retrieval manager, for converting the new or modified data in the first form to new or modified data in a structural data form, and for storing the new or modified data in the structural data form in one or more databases, wherein the structural data form is suitable for a structural search query. It should further be noted that other embodiments, aspects, features, objectives and advantages of the present invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. Like reference numerals are used to indicate like components. In the drawings.

DETAILED DESCRIPTION OF THE PREFERRED EMBODIMENT

Figure 1:
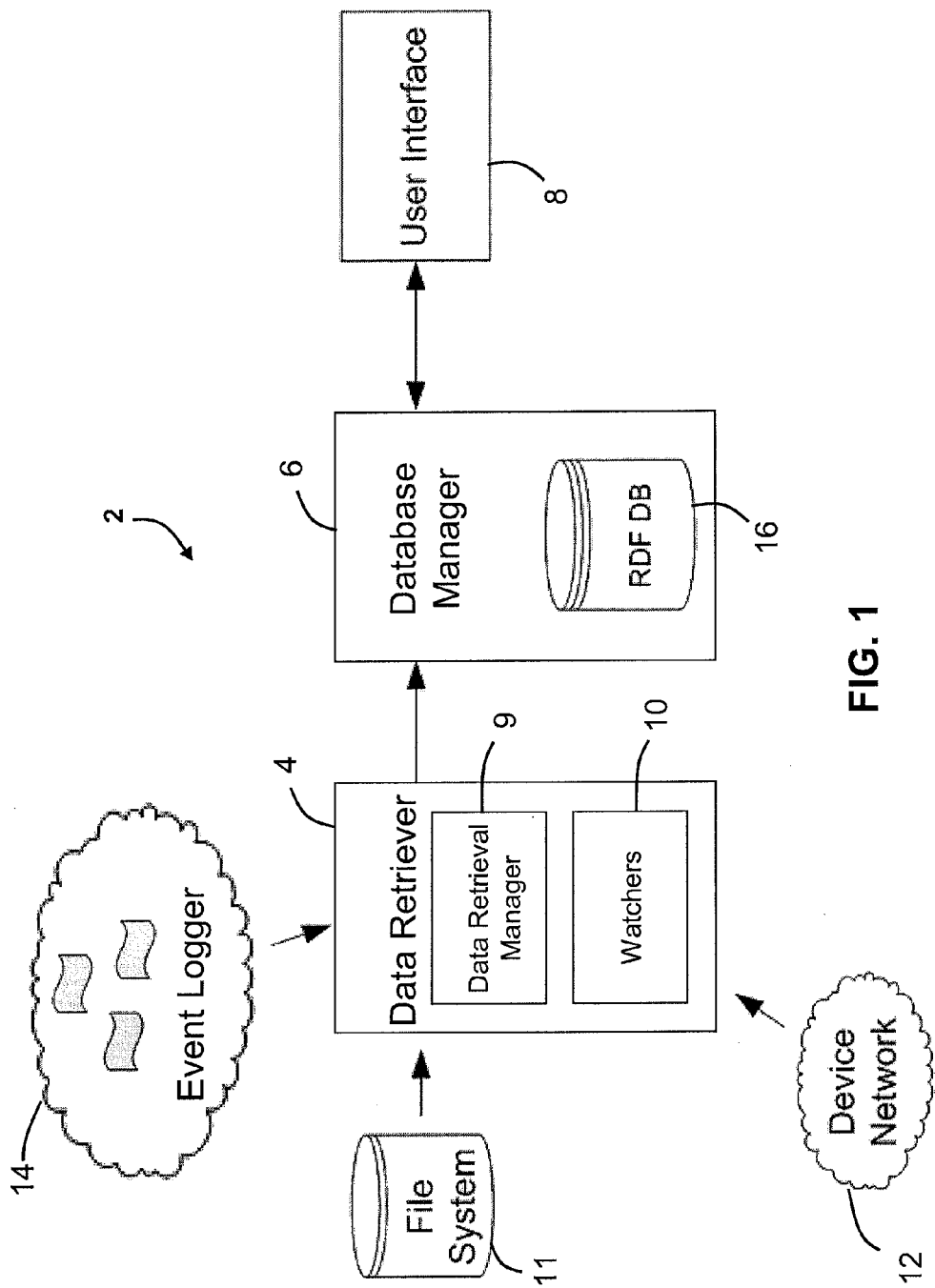
FIG. 1 is a schematic view of an exemplary data retrieval and storage system in communication with an exemplary user interface.

Referring to FIG. 1, an exemplary data retrieval and storage system 2 that includes a data retriever 4 and a database manager 6 is shown in communication with an exemplary user interface 8. As a general overview, the data retriever 4 utilizes a data retrieval manager 9 and one or more watchers 10, to acquire and update data associated with a variety of industrial devices, for example, those associated with the automation, control and supervision of industrial machines. This data can take a variety of forms. Data associated with an industrial device, such as a PLC, can be retrieved from various places, such as from a file system 11, a device network 12, and or an event logger 14. The data retriever 4 preprocesses the data to provide data in a first form which is communicated to the database manager 6. The database manager 6 integrates the data from the various sources, creating one or more structural databases 16 that can be accessed and searched via the user interface 8 using a structural search query.

Figure 2:
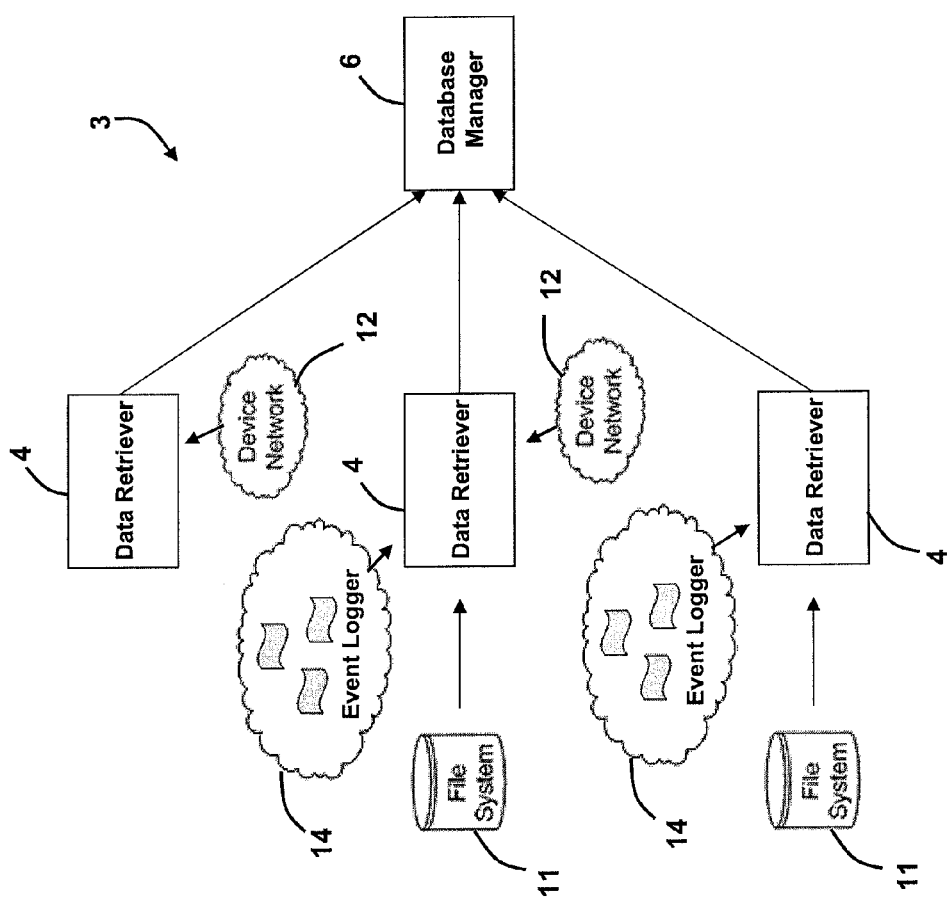
FIG. 2 is a schematic view of another embodiment of the data retrieval and storage system illustrating multiple data retrievers each connected to various data sources.

As shown in FIG. 2, another embodiment of a data retrieval and storage system 3 includes multiple data retrievers 4, located in one or more places, to form a distributed system. In this embodiment, the database manager 6 can receive data from each of the multiple data retrievers 4, where each data retriever 4 can be in communication with one or more data sources, such as associated with a single industrial machine or associated with multiple machines on a manufacturing assembly line. Further, each data retriever 4 can be situated at a different manufacturing facility, or situated in the same facility but in communication with various devices or sources located in other facilities.

As illustrated in FIGS. 1 and 2, each data retriever 4 can be in communication with a variety of sources, including at least one of a file system 11, a device network 12, and an event logger 14. File system 11 can include data files in various formats associated with a variety of sources, such as files located on a server, files located on a personal or industrial computer used for machine troubleshooting or program designing, or data files stored on a device such as an HMI panel. A device network 12 connects a multitude of devices via a network, which can be for example, an intranet, internet, World Wide Web, wired or wireless network, or any network of industrial devices. The device network 12 can provide data information that includes an indexing of all the devices on the device network 12 and data associated with these devices. For example, the indexing can identify that a PLC named Filler_line_PLC and an HMI named Filler_View_HMI are located on the device network and identify their particular addresses. In addition, data associated with a particular logged event, such as a machine fault alarm initiated by a particular device, can be stored in the file system 11 or in a separate program or event logger 14 that can be accessible by the data retriever 4. As noted above, all the data acquired from the various sources can be preprocessed by one or more data retrievers 4, and can be received and stored by the database manager 6.

Similarly, although only a single centralized database manager 6 is illustrated in FIGS. 1 and 2, the database manager 6 can be distributed over multiple nodes, e.g., over various computers or servers. By distributing the database manager 6 over multiple nodes, the computational load borne by the database manager 6 can be reduced, providing greater data acquisition speeds when searches are performed by user interfaces 8. Distribution of data also leads to greater tolerance to faults of a single database to the whole search system.

To populate the structural databases 16 of the database manager 6, the data retriever 4 can obtain data from a source (e.g. devices) by either pulling the data from the source, or by having the source push the data to the database manager 6.

Figure 3:
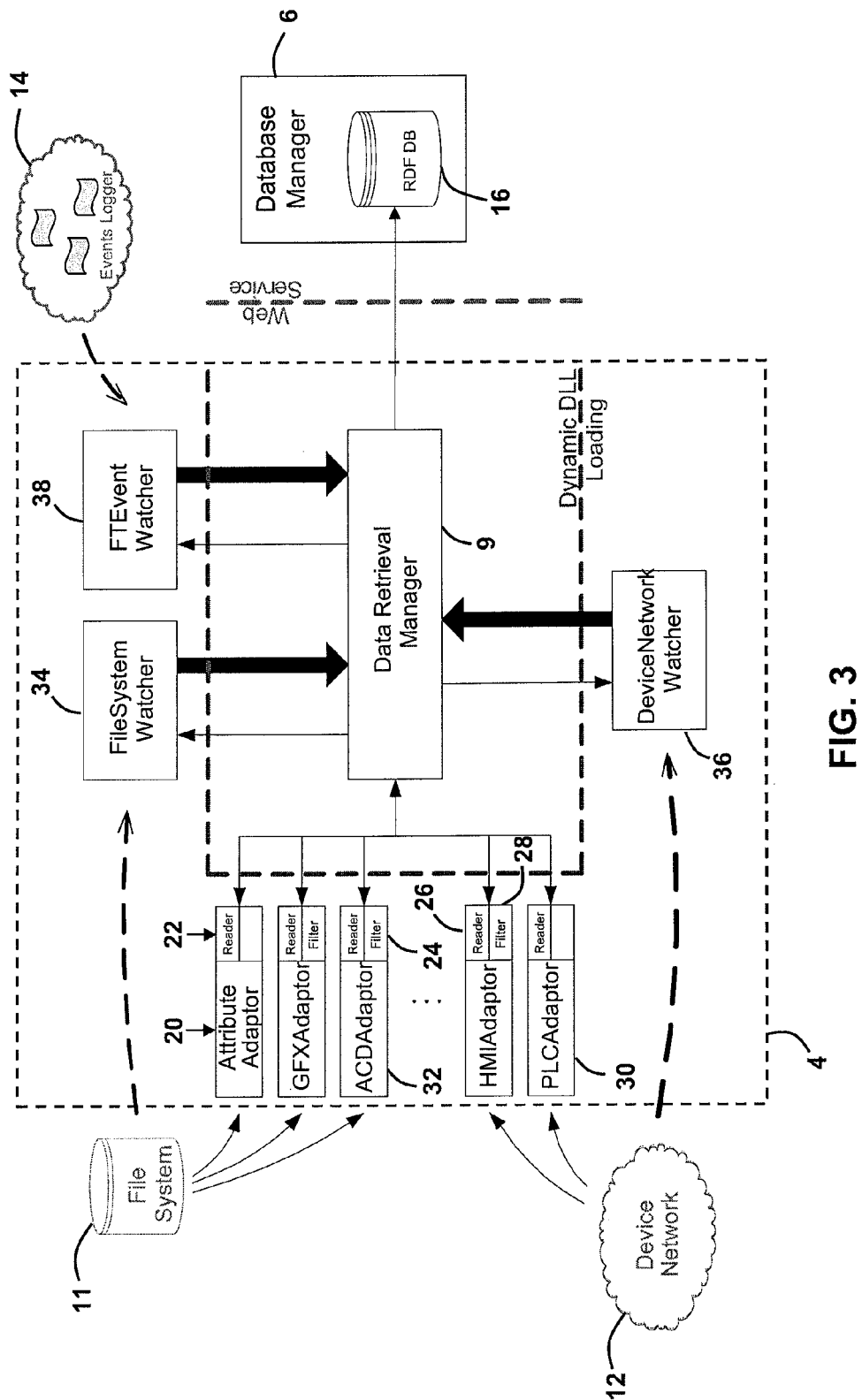
FIG. 3 is a detailed schematic view of the exemplary data retrievers illustrated in FIGS. 1 and 2.

FIG. 3 illustrates in more detail the exemplary data retriever 4 shown in FIGS. 1 and 2. The data retriever 4 includes the data retrieval manager 9 that is capable of reading data (pulling data) from a source, such as the file system 11, the device network 12, or the event logger 14, using various adapters 20. Each adapter 20 has a corresponding reader 22 which is configured to read a particular format of data, such as HMI display graphic files (GFX), HMI project configuration, PLC files with ladder logic code (ACD), files attributes and file metadata, for example NTFS metadata. In addition, one or more adapters 20 can include a pre-designed filter 24 that pre-processes the device data to remove unnecessary information, add new information, and/or make changes to the structure of the data, which is useful for later integration of the data into the database. Changes in the structure of the data can include converting the data to another format, for example, XML (extendable markup language), OWL (web ontology language), or an RDF (research description framework) model, although this conversion can also be accomplished by the database manager 6 after the data is received from the data retrieval manager 9.

In one exemplary embodiment, the data retrieval manager 9 can use the HMI reader 26 to read the data from one or more HMI devices (not shown). The HMI reader 26 is configured to process the data format associated with an HMI device. The data received by the data retrieval manager 9 can then be sent to an HMI filter 28 for further processing. In addition, some readers may share a common filter for multiple data sources that provide the same or similar kind of data. For example, the filter 24 can be configured to have predefined instructions (program code) suitable for application with multiple adapters 20, thereby allowing the data retrieval manager 9 to read data from a first one of the adapters 20, such as a PLC adapter 36, and then filter the data through another one of the adapters 20, such as an ACD adapter 32. Use of such generic filter instructions can obviate the need for keeping multiple, almost identical or identical individual filters 24 associated with multiple adaptors 20.

In one embodiment, the data retrieval manager 9 can communicate with one or more watchers 10 that can be distributed to computers, servers, or other locations to monitor data and look for changes in the data. If a change in data or devices is discovered, a notification can be sent to the data retrieval manager 9. Exemplary watchers 10, such as a file system watcher (FSW) 34, a device network watcher (DNW) 36, and an event watcher (EW) 38, are shown in FIG. 3 in communication with the data retrieval manager 9. The watchers 34, 36, 38 monitor the file system 11, device network 12, and event logger 14, respectively. As data is changed or otherwise updated, the watchers 34, 36, 38 notify the data retrieval manager 9 and the data retrieval manager 9 can retrieve the modified data via its associated one or more adapter (and associated one or more readers) from the data sources. In some embodiments, in order to identify if any changes have been made, the watchers 34, 36, 38 can periodically upload a device's data using one of the associated readers (not shown but similar to reader 26) to compare it with a previous version of the device's data. In this case, if changes are detected, then the new uploaded data can be downloaded directly to the data retrieval manager 9 for further processing. Although FIG. 3 illustrates three watchers, in other embodiments, other numbers of watchers can be used for monitoring and updating data changes from various data sources.

Figure 4:
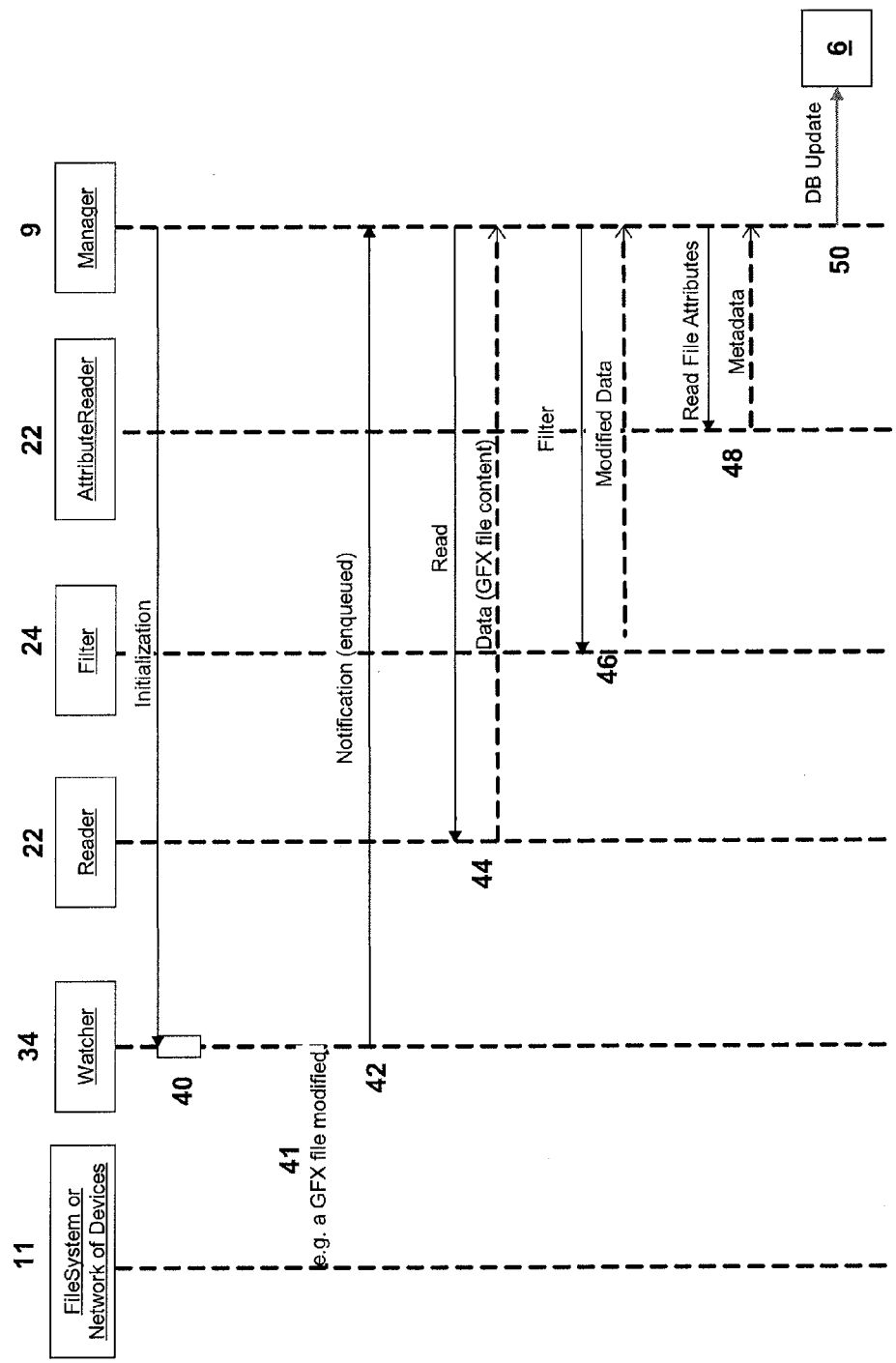
FIG. 4 is an exemplary flow chart of the operation of the exemplary data retrieval and storage system of FIG. 1.

An exemplary embodiment of a method of operation of the data retrieval and storage system 2 utilizing a watcher 10 to monitor and update a database manager 6 is understood with reference to FIG. 4. Although the depicted watcher is denoted by a file system watcher 34, in other embodiments, other types of watchers can be employed to monitor other types of data including files and events or data relating to devices in a network, and the device network itself, including the structural arrangement of devices on the network.

In particular, at step 40, the data retrieval manager 9 initializes a watcher. In general, the initialization may include indexing of all available data before monitoring data changes is started. In the case of the file system watcher 34 which monitors the file system 11, the initialization may include selecting parts of file system to be monitored. In the case of device network watcher 36, this initialization may contain information necessary to determine whether any modifications (including changes, additions, removals, or other updates) to data on device network 12 have been made. This determination can require that the watcher 36 (shown in FIG. 3) be provided with initial information regarding the last data content of devices on the network 12, and can entail a comparison of device listing to a previously stored device listing, a direct comparison of data contents to prior device data contents, or instead a comparison of a data parameter, such as a hash function, which is a small digital "fingerprint" made from any kind of data, to that data parameter determined at a prior time.

At step 41, if the watcher 34 detects that a file, such as a GFX (graphics) file located in the file system 11, has been modified, the file system watcher 34 in step 42 sends a notification to that effect to the data retrieval manager 9. The notification can include information regarding the type of data that has been modified, for example that a GFX file has been modified. The data retrieval manager 9 then processes the notification to determine an appropriate adapter, including appropriate reader 22, for reading GFX file type data.

At step 44, the data retrieval manager 9 then enables an appropriate reader 22 to read the GFX file type data from the file system 11 and uploads the corresponding data. The data retrieval manager 9 can optionally preprocess the data to change its format and content. For example, at step 46, the data retrieval manager 9 can send the GFX file data through filter 24 to preprocess or otherwise modify the data to provide a desired format suitable for the database manager 6, wherein the filter 24 can operate to filter out unnecessary information such as volatile data that are changing too frequently and there is no interest in storing this data in the database for search, add additional information, and/or make changes to the structure of the data.

At step 48, an attribute reader 22 can be used by the data retrieval manager 9 to read and upload metadata associated with the file, such as the date of last modification, file size, etc. At step 50, the data retrieval manager 9 sends the preprocessed data, along with any desired metadata information, to the database manager 6. The preprocessed data is then integrated with the existing data in the database 16 as described below.

As mentioned above, the data retrieval manager 9 can obtain data by either pushing or pulling the data from sources. Another manner of pulling data utilizes the device network watcher 36 to perform the function of a centralized crawling service to pull data from a network of devices by crawling the network of devices to discover all searchable devices. The network structure can be discovered, stored and indexed, such that the service can monitor if a source of data has changed, such as if a device has been removed or added. Further, modified or updated data can be identified by various methods, including reviewing time stamps for files and/or retrieving and comparing a portion of the data and comparing it to a previously uploaded data portion such as hash code. The device network watcher 36 can upload data from each device using the data retrieval manager 9 along with the aforementioned adapters 20, readers 22 and/or filters 24.

As an alternative to or in addition to a data pull system, a data push system can also be used to obtain initial and refreshed data from various sources. In a data push system, a data source can have an external program loaded thereon that can monitor data changes and when required send data in a predefined format to the database manager 6. Additionally, a data source such as a PLC can have an integral program that is configured to monitor data changes and notify the data retrieval manager 9 that then ensures proper preprocessing of raw data, for example using Filters 24. As an alternative, this internal program can preprocess the data itself and send them directly to database manager 6. Additionally, the use of a resident program having data push programming on a data source can obviate the need for a separate data retrieval manager 9, and the adapters 20, readers 22 and filters 24 associated with the aforementioned data pull configurations. Further, the data push configuration can also allow additional information to be communicated to the database manager 6 that would be more cumbersome or otherwise unavailable using the data pull configuration.

Figure 5:
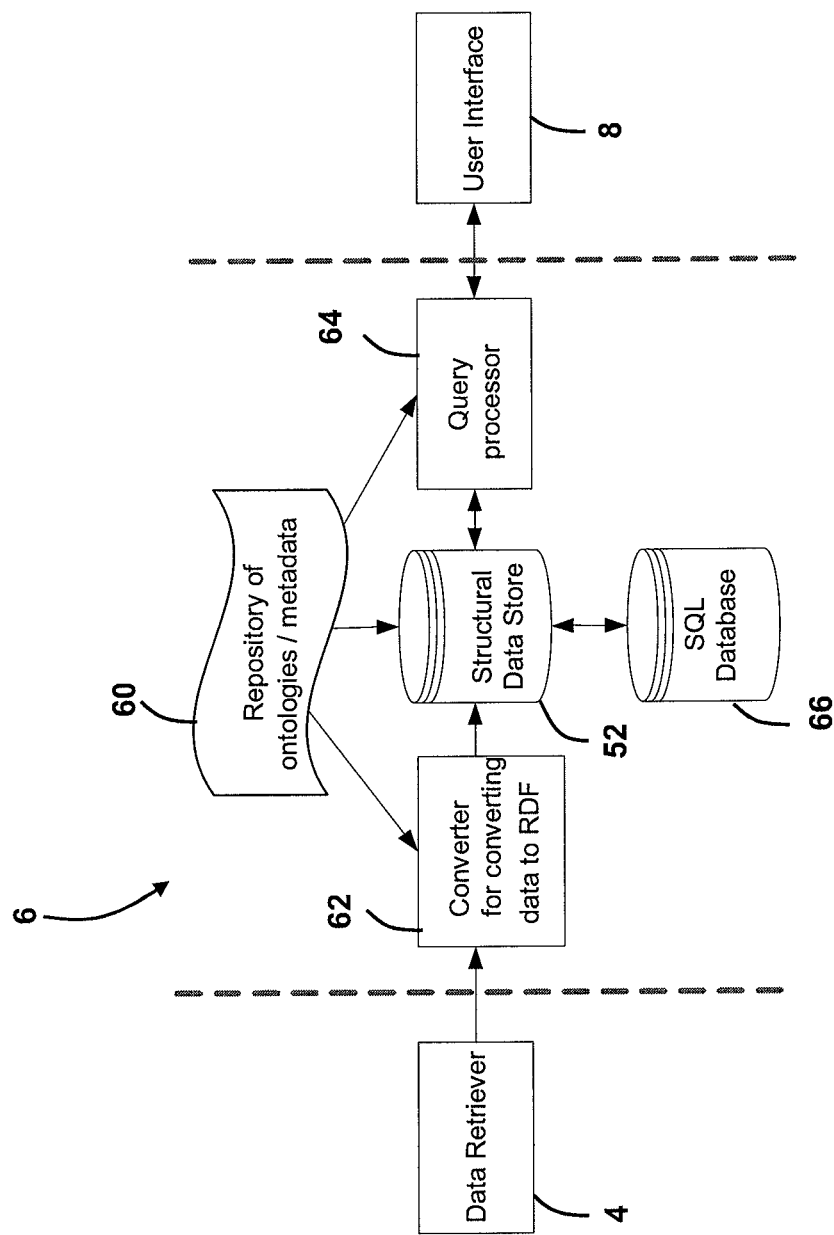
FIG. 5 is a schematic view of one embodiment of the database manager.

FIG. 5 illustrates in more detail the database manager 6 of FIGS. 1 and 2, which receives uploaded or modified data in a first form from one or more data retrievers 4 and converts it to a structural form. A structural data form can include classes, attributes, literals and relations between classes. The database manager 6 integrates the data to be stored as an aggregation of data in one or more databases, which can be searched using the user interface 8. In the illustrated case, industrial data from the data retriever 4 (one of which is shown in FIG. 5) is converted into an RDF format by converter 60 for storage in a structural data store 52 and/or database 56. The process of converting the data into structural form for storage in the structural data store 52 can be driven by ontologies and metadata from repository 60. Repository 60 can contain information about the structure of indexed data, such as the structure of HMI interfaces and PLC ladder logic. The ontologies and metadata are used as a base for the data conversion by converter 60 and for query processing by query processor 64.

The structural data can be stored in the structural data store 52 in various formats, such as RDF, object oriented database, XML, etc. that can be used to generate and preserve structural relations identified in the data. For example, a structural database 52 can preserve relations with respect to tag T between data such as "controller C has ladder code with routine A that contains rung with instruction I that uses tag T" and data such as "HMI project P contains push button B that is writing to tag T". A query processor 58 of the database manager 6 is in communication with the user interface 8 to process a structural data query generated using the user interface 8. Results of the query from the data store 52 can be returned to the user interface.

As discussed above, the database manager 6 can be distributed over multiple nodes. Several configurations can be used when providing a database manager 6 distributed over multiple nodes. For example, the database manager 6 can be segregated by logical/geographical area, by product, such as a particular machine, and/or by redundant data distribution. A logical/geographical area distribution can be used to group the data from devices associated with a particular manufacturing process or a group of processes running at a single manufacturing facility or group of manufacturing facilities in a particular geographical area. This approach allows a user to search a specific area, thereby providing a faster search, as the query would be limited to that area. In addition, the search can be broadened to include multiple areas as required to satisfy the search. Further, the database manager 6 can be segregated by type of device. Segregation of the database manager 6 by device type, such as PLCs only, would alleviate the need for the database manager 6 to provide integration of data from different software packages such as those found in PLC and HMI devices. By alleviating the need for integration, a search query can be quickly resolved. Therefore, a database manager 6 can be provided for each type of device, such that one database manager 6 can provide a compilation of the data for all the PLCs situated across various networks of one or more manufacturing facilities. Another method of storing data in database manager 6 would be to provide redundant database managers 6, wherein identical data is indexed and stored in each of the redundant database managers 6. By providing redundant database managers 6, the data retrieval system 2 is more evenly supported and is provided with one or more backups in case of the failure of a database manager 6.

Figure 6:
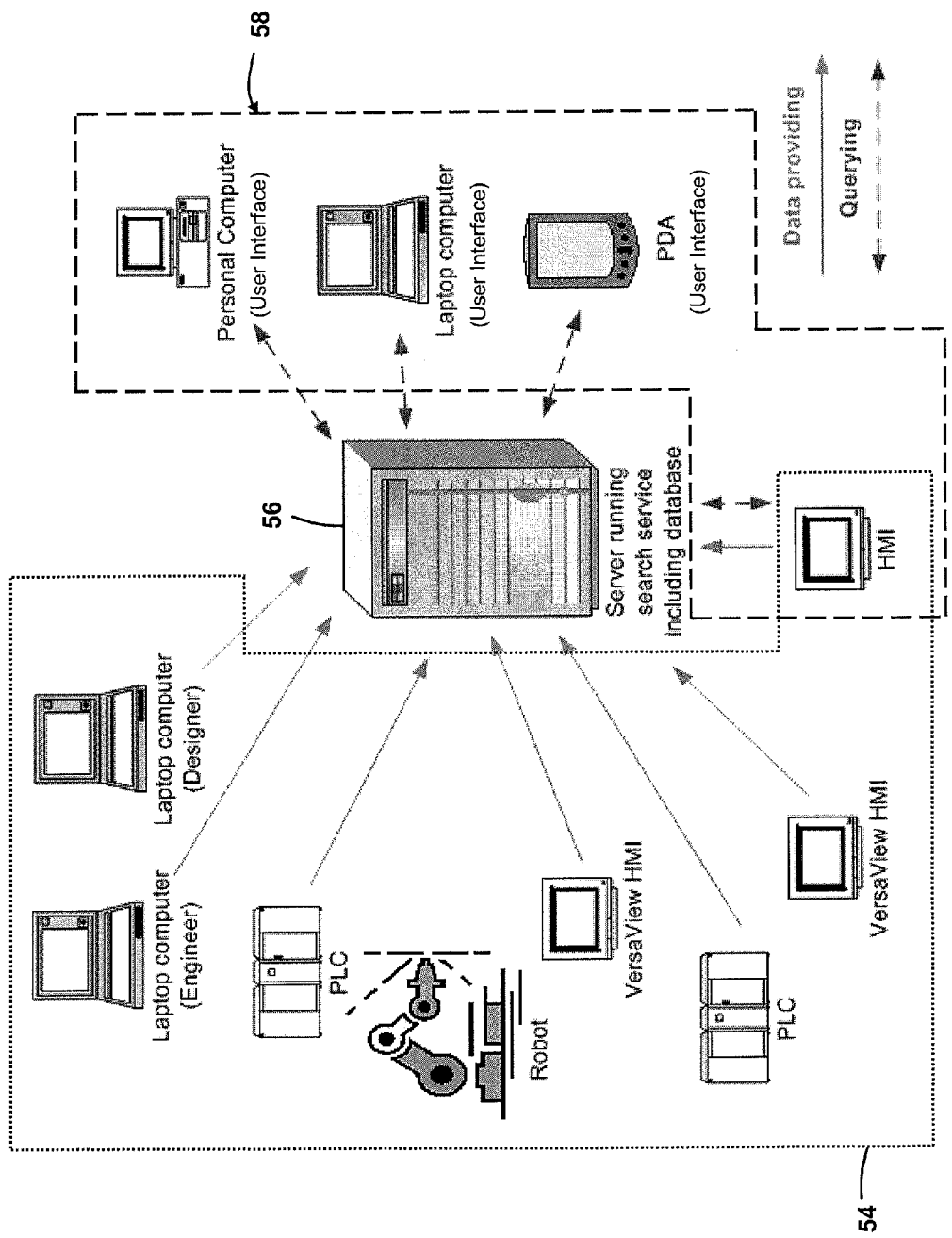
FIG. 6 is a representative view of the data retrieval and storage system of FIG. 2 in communication with various devices and user interfaces.

FIG. 6 is a representative view of the data retrieval and storage system of FIG. 2, which can, for example, be in communication with and seek to monitor various data sources 54, such as laptop computers, PLCs, and various HMI devices. The watchers 34, 36, 38 of data retriever 4 can be located in various locations, including on the computers, a server 56, or a device network (not specifically shown in FIG. 6). Retrieved (new or modified) data can be provided to server 56 which includes and runs at least portions of the exemplary data retrieval and storage system 3 of FIG. 2. The database manager 6 in the server 56 is accessible from user interfaces 58. One or more of the data sources 54, such as a HMI device or a computer, can also be capable of functioning as one of the user interfaces 58.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method for retrieving industrial data and providing data in a structural form in a searchable database, the method comprising:
   reading data from an industrial data source including a controller;
   using a watcher to monitor the data for additions or modifications;
   notifying a data retrieval manager when additions or modifications to the data have occurred;
   uploading any new or modified data from the data source to the data retrieval manager;
   converting the new or modified data to a structural form including both class and attribute portions; and
   storing the new or modified data in the structural form in a searchable database.

2. A method of retrieving and storing industrial data so as to facilitate searching, the method comprising:
   receiving, at a data retrieval manager, data of a plurality of types associated with one or more industrial devices, the data including first data of a first type that includes ladder logic data and second data of a second type that includes human-machine interface (HMI) data,
   wherein the data associated with the one or more industrial devices is obtainable from searching at least one of a file system, an event logger, a real-time data logger, and a device network, and wherein the one or more industrial devices includes a controller; and
   converting, by way of a database manager, the received data from being in a first form to being in a structural data form including both class and attribute portions; and
   storing the converted received data in one or more databases,
   whereby because the stored converted received data is in the structural data form, searching is facilitated.

3. A method for retrieving industrial data and providing data in a structural form in a searchable database, the method comprising:
   reading data from an industrial data source, wherein the data is obtainable from searching at least one of a file system, an event logger, a real-time data logger and a device network;
   notifying a data retrieval manager when additions or modifications to the data have occurred;
   uploading any new or modified data from the data source to the data retrieval manager;
   converting the new or modified data to a structural form;
   storing the new or modified data in the structural form in a searchable database, the structural form including both class and attribute portions; and
   integrating the new or modified data in the structural form in a database with other data based on common terms and forming inference connections between the terms.

4. The method of claim 1, further including filtering the new or modified data to provide new or modified data in a first form which is then converted to new or modified data in the structural form.

5. The method of claim 1, wherein the structural form is suitable for a structural search query.

6. The method of claim 1, wherein the data is obtainable from searching at least one of a file system, an event logger, and a device network.

7. The method of claim 1, wherein the watcher includes one of a file system watcher, a device network watcher, and an event watcher.

8. The method of claim 1, wherein the structural form is a resource description framework (RDF) format.

9. The method of claim 1, wherein the data retrieval manager initiates data monitoring by the watcher.

10. The method of claim 1, wherein the controller includes a programmable logic controller (PLC), and the data includes first data of a first type that includes ladder logic data and second data of a second type that includes human-machine interface (HMI) data.

11. The method of claim 2, further comprising notifying, by way of one or more watchers, the data retrieval manager when the data associated with the one or more industrial devices is new or modified.

12. The method of claim 11, wherein the data retrieval manager is configured to initiate monitoring by the one or more watchers.

13. The method of claim 3, further comprising using a watcher to monitor the data for additions or modifications, wherein the industrial data source includes a controller, and wherein the data includes first data of a first type that includes ladder logic data and second data of a second type that includes human-machine interface (HMI) data.

14. The method of claim 4, further including integrating the new or modified data in the structural form in a database with other data based on common terms and forming inference connections between the terms.

15. The method of claim 11, wherein if the one or more watchers detect that one or more files of the data are removed, the one or more watchers provides a notification thereof to the data retrieval manager.

16. The method of claim 11, wherein the one or more watchers include at least one of a file system watcher, a device network watcher, and an event watcher.

17. The method of claim 16, further comprising reading the new or modified data by way of one or more adapters.

18. The method of claim 17, wherein at least one of the adapters is operable to filter the new or modified data so as to be in the first form.

19. The method of claim 18, wherein the database manager includes a data converter configured for performing the converting.

20. The method of claim 19, wherein the structural data form is a resource description framework (RDF) format.

* * * * *